United States Patent [19]
Catlow

[11] Patent Number: 4,486,775
[45] Date of Patent: Dec. 4, 1984

[54] OBJECT RECOGNITION

[75] Inventor: George W. Catlow, Newbury, England

[73] Assignee: Micro Consultants Limited, Berkshire, England

[21] Appl. No.: 313,009

[22] Filed: Oct. 19, 1981

[30] Foreign Application Priority Data

Oct. 17, 1980 [GB] United Kingdom ............... 8033538

[51] Int. Cl.³ ............................................. H04N 7/18
[52] U.S. Cl. ..................................... 358/106; 382/30; 382/34
[58] Field of Search ............... 358/106; 356/237, 390, 356/394; 382/30, 33, 34, 28

[56] References Cited

U.S. PATENT DOCUMENTS 3,049,588  8/1962  Barnett ................................ 358/106
4,006,296  2/1977  Peterson ............................. 358/106
4,056,716  11/1977 Baxter et al. ....................... 358/106

OTHER PUBLICATIONS

Hu-Visual Pattern Recognition by Moment Invarients-IRE Trans. Info. Theory (1962) vol. IT-8 pp. 179-187.

Primary Examiner—Joseph A. Orsino, Jr.
Attorney, Agent, or Firm—Dowell & Dowell

[57] ABSTRACT

An object recognition system includes several pivotable cameras and frame stores for capturing images of the moving object from various aspects. The data is passed to compressors to provide simplified correlation of data in correlators also receiving data from a compressed image library to allow the object and/or its orientation to be determined.

9 Claims, 8 Drawing Figures

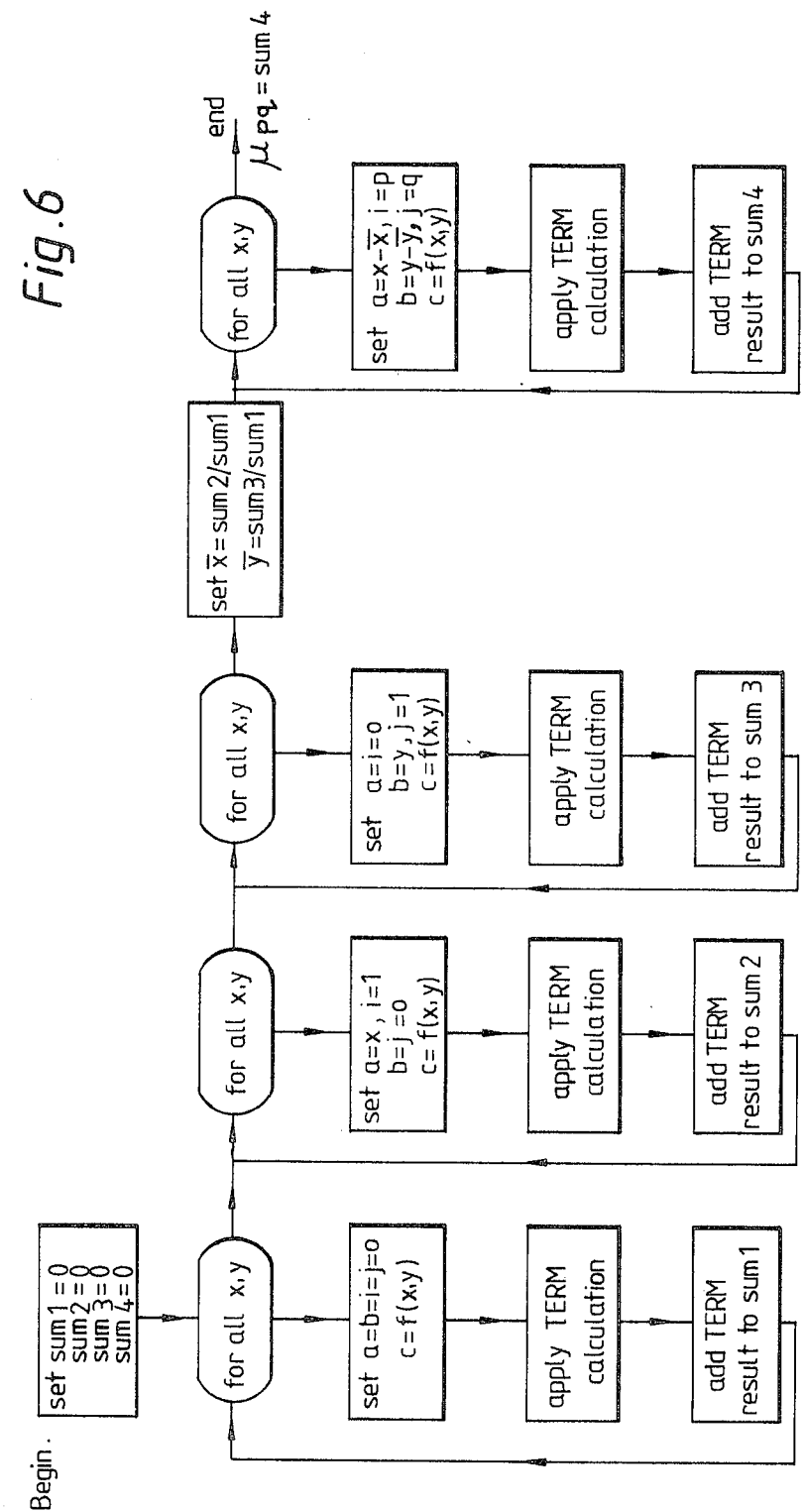

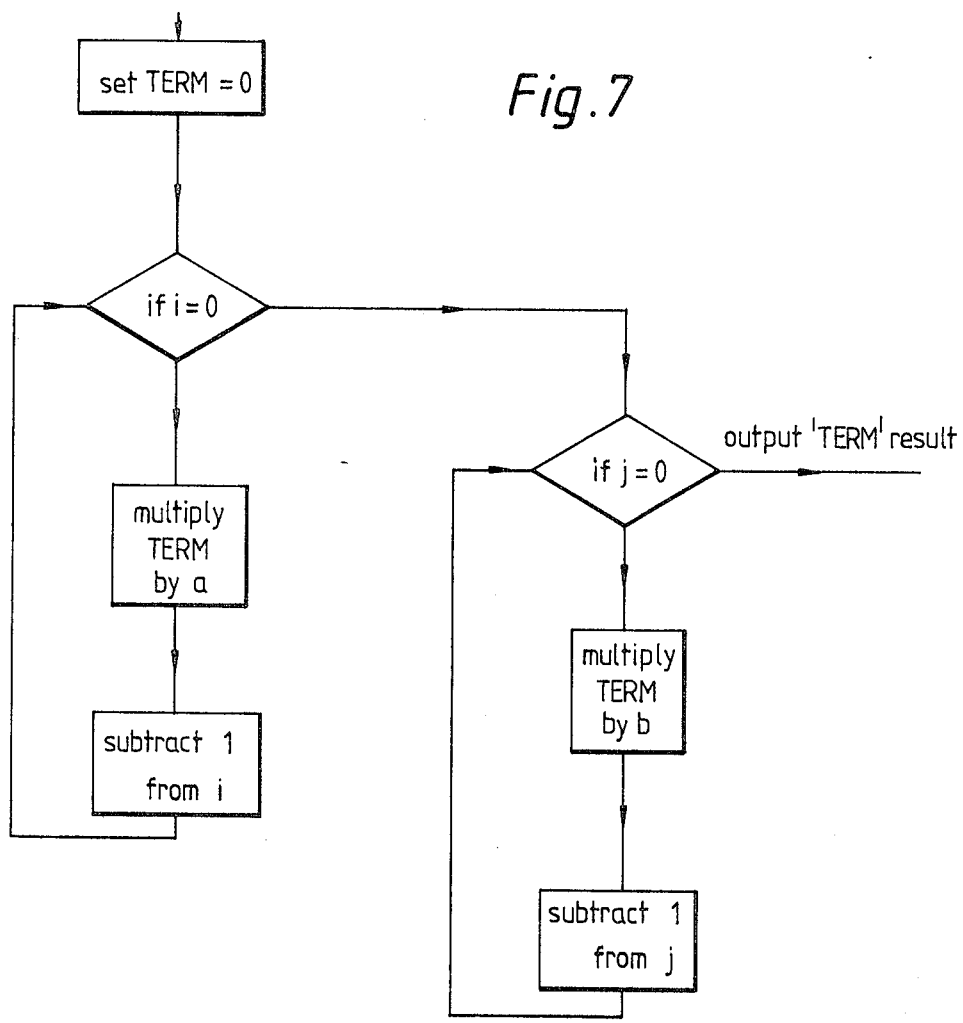

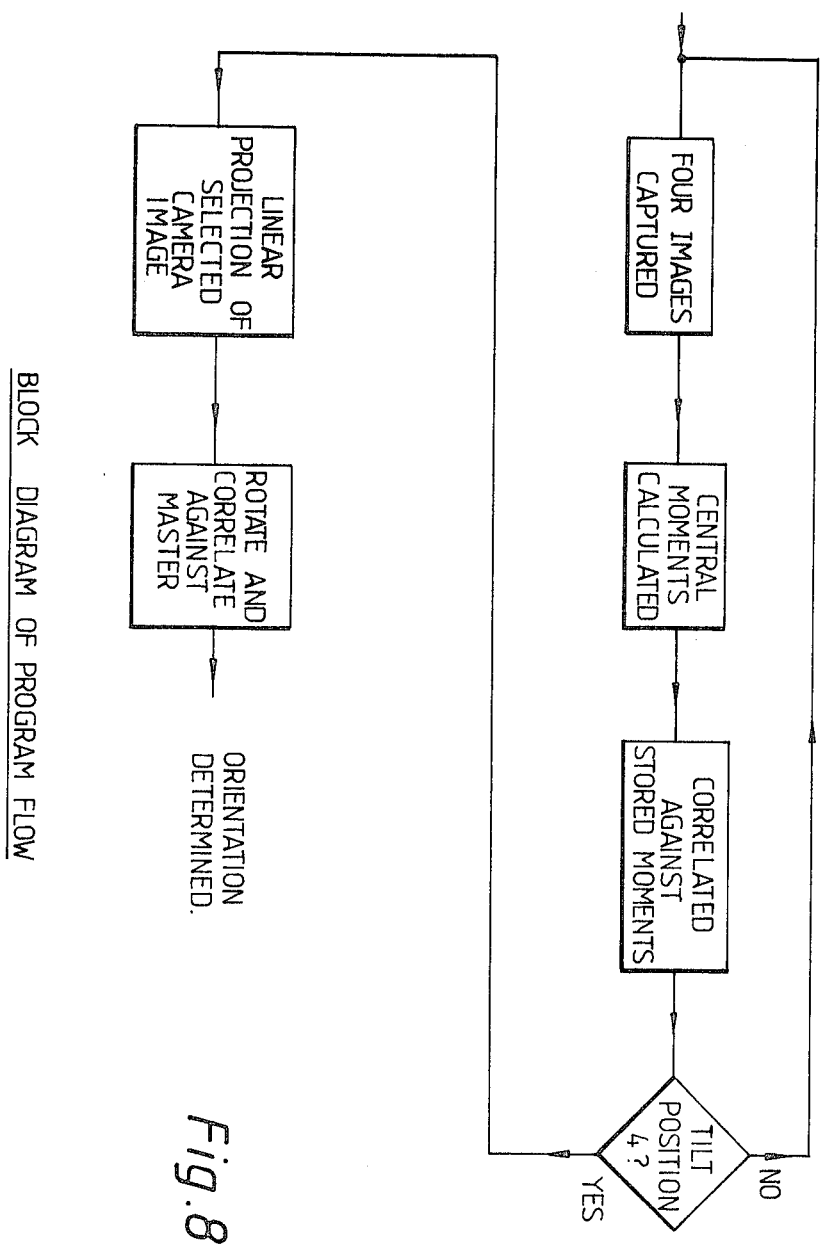

OBJECT RECOGNITION

BACKGROUND OF THE INVENTION

The invention relates to the recognition and/or determination of the orientation of an object, for example a machine casting moving on a conveyor belt.

The use of robots on the assembly process of industrial machinery is greatly curtailed by their lack of vision. Even if vision is provided it usually only enables the robot to make a single simple decision. For example, it might be used just to confirm that a hole has been drilled into a part before assembly. In such known systems use is typically made of a single camera with the facility of comparing the information with a single stored image and it is required that the object be placed on a rotatable table and by rotating this table, establish when correlation between the image from the camera and the stored image is reached. The invention now to be described provides the robot or other interfaced device with far more powerful vision and thus greatly enhances its powers of recognition.

SUMMARY OF THE INVENTION

According to the invention there is provided an object recognition system comprising means for capturing a plurality of images of the object each taken from a different aspect, processing means for effecting data compression on the incoming image information to reduce the quantity of data presented for recognition, correlation means for comparing the compressed image data with previously derived image data to determine whether any similarity is present.

BRIEF DESCRIPTION OF THE DRAWINGS

The invention will now be described by way of example with reference to the accompanying drawings, in which:

FIG. 6 shows an example of the logic path employed to compute the centralised moments, FIG. 7 shows an example of the TERM calculation logic path, and FIG. 8 shows an example of a typical flow diagram of the system operation.

DESCRIPTION OF PREFERRED EMBODIMENT

In industrial plants, machine parts or castings are often transported to the points of assembly by continuously moving conveyor belts or lines. A robot for example performing the assembly of parts must be able to "see" the part's position and just as importantly, it's orientation so that it can pick up the part in the correct way for assembly.

This visual capability is achieved in the present invention by processing images of the object under scrutiny taken from different aspects typically using a group of cameras and matching the processed data with previously manipulated stored image data of known orientation of that object as now described.

Figure 1:
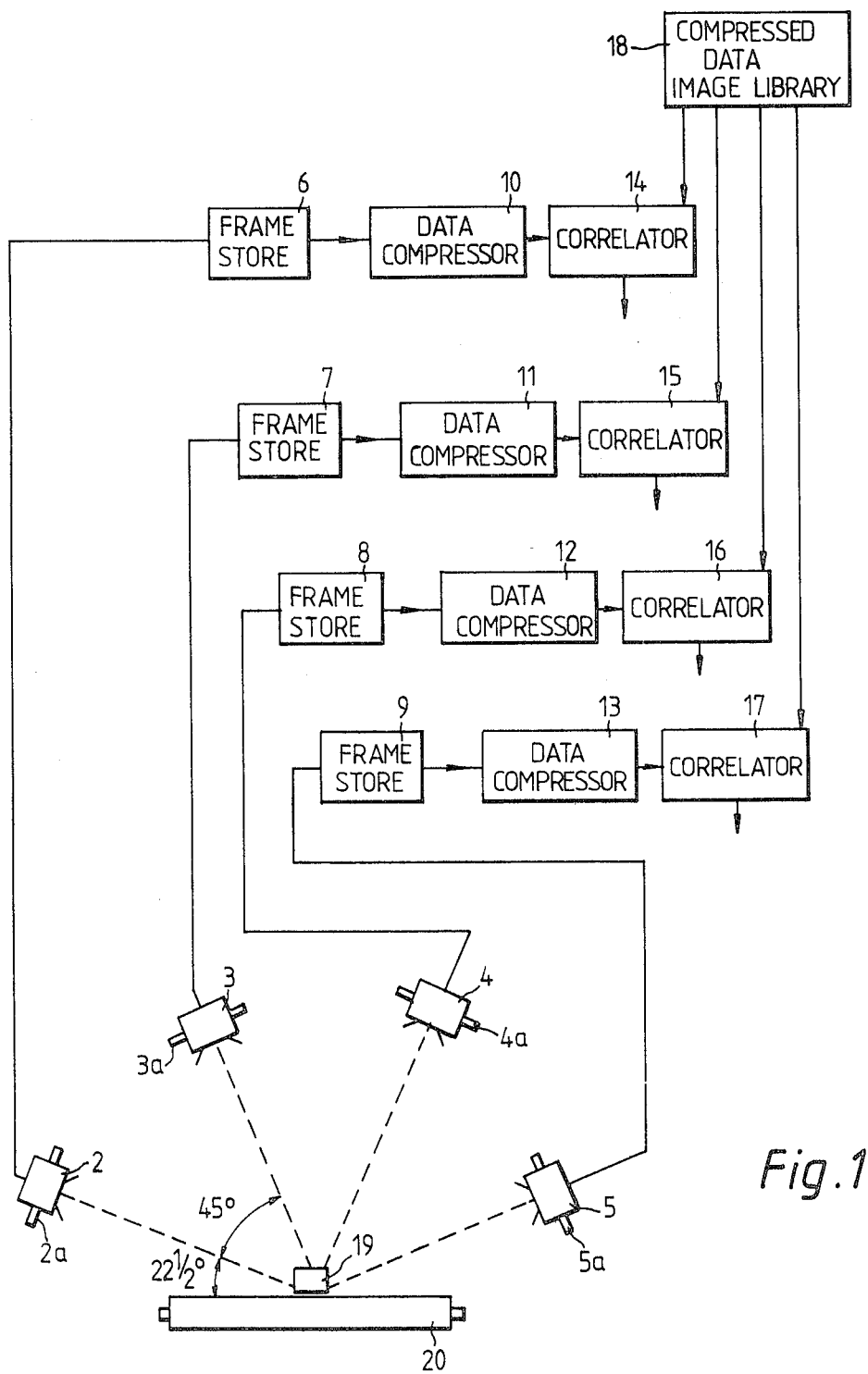
FIG. 1 shows the basic system of the present invention.

The system of FIG. 1 comprises four cameras 2-5, four frame stores 6-9, four data processors 10-13 and four correlators 14-17. The correlators have access to library 18. The object 19 of interest is shown on a conveyor 20 such that the object would move past the array of cameras (i.e. into the Z plane). Each of the cameras is provided to give a different viewing aspect of the object and the output of the respective cameras is held in frame stores 6-9. The captured images are then passed to respective data compressors 10-13 which provide an output derived from the image data but processed to simplify the correlation steps effected by respective correlators 10-13. The correlators have access to a library of images which have been previously processed in a similar way. The simplest way of producing such a library is to place the known object in various positions and store the manipulated images from the compressors 10-13 directly in library 18. The cameras are shown in this example as spaced apart at 45° relative to the object.

Figure 2:
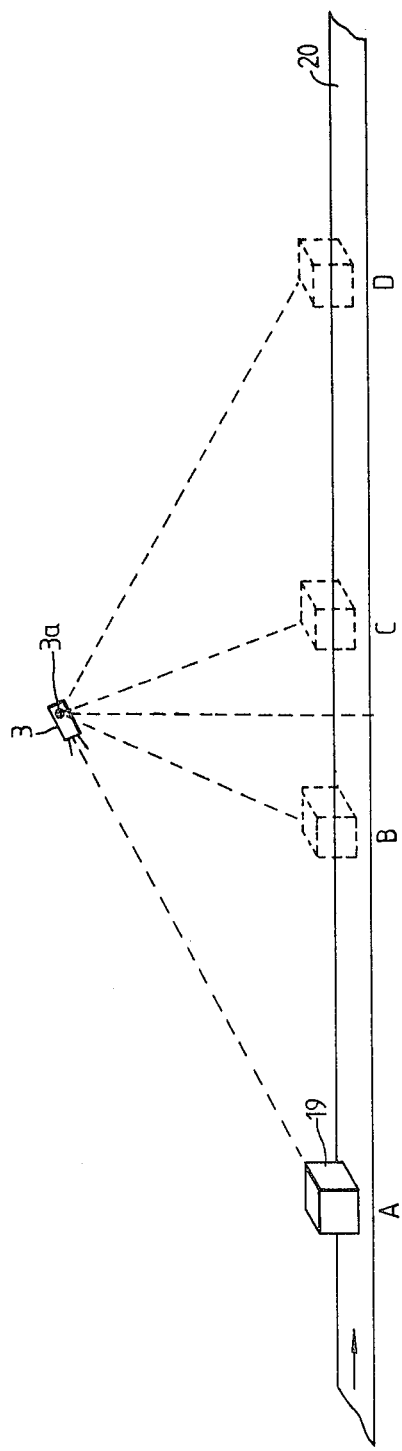
FIG. 2 shows the selectable tilt positions of the cameras in use located over the conveyor belt.

To increase the number of aspects the object is observed from, the cameras 2-5 can be arranged to pivot about respective axles 2a-5a. This is especially necessary if the shape of the object is complex. Each camera could be tilted into four positions as shown in FIG. 2 as the object (e.g. a casting) moves along the belt. In the example the four positions A,B,C and D are illustrated to be to be at an angle of 45° relative to the next or previous position. The cameras can be conveniently moved into the various tilt positions by being linked to the existing conveyor drive and making use of microswitches for example to determine when the desired tilt position has been reached.

Although FIG. 1 shows a system with four cameras, the arrangement could be modified to use a single camera to move in an arc and frame stores 6-9 would capture the image for a given position at 45° intervals. Similarily although the object is moving relative to the cameras, the system would operate if the cameras were operated to achieve the same relative movement.

When correlation at the output of a particular correlator 14-17 is achieved with the data from the library, the identity and orientation of the object will then be known.

The data compressors are required because the normal image typically of 256×256 picture points would require correlation for each picture point and for each of a library of images until coincidence was detected. Such an operation would take too long to be practical and so it is necessary to manipulate the image data to provide simplified correlation yet retaining sufficient information to unambiguously identify the object observed.

IMAGE LIBRARY GENERATION

Prior to actual use of the system, a library of processed images of the casting must be generated. A direction of view of the casting should be chosen which will allow the 2 dimensional image as seen along this direction to uniquely determine the castings 3 dimensional orientation. Obviously rotation about any axis of rotational symmetry can be ignored.

The view of the casting along the chosen line is taken by a single camera and captured with a typical resolution of 256×256 pixels by 4 bit greyscale.

Figure 3:
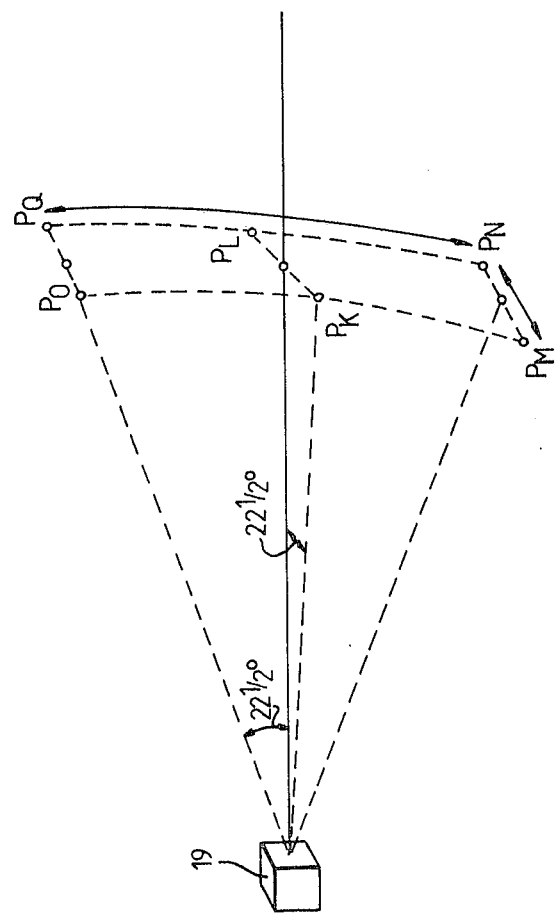
FIG. 3 shows possible camera positions used to compute the library of processed image data.

The camera is then moved in angular increments in both the x and y directions whilst still pointing at the casting as shown in FIG. 3. In this example the point P corresponds to the central viewing position and the range of angular movement about the initial line of view is chosen to be $+22\frac{1}{2}°$ to $-22\frac{1}{2}°$ in both directions. Thus a number of images will be captured between the positions PK and PL and this approach is adopted throughout the viewing area bounded by the viewing positions PM to PQ. At each camera position within this range an image of the casting is processed to provide the compressed identity data. This information is typically stored in the library together with the angular position of the camera.

The number of image positions actually used will determine the accuracy of the system. An array of 45×45 positions used to provide the library of image data will give no more than $\frac{1}{2}°$ error.

Thus the data compressor 10 provides an indentification "fingerprint" for a given object orientation of sufficient detail to distinguish this from other object orientations yet allowing rapid identification from the library. When identity is detected by a correlator, since the library position associated with this image is known and the original orientation and object is known, this data is sufficient to instruct any interfacing device which can then be caused to respond accordingly. Such data can be translated into machine instructions via a look up table for example.

It is to be appreciated that the object under scrutiny will typically be of more complicated shape than the simple representation in the drawings.

One example for providing suitable compression techniques will now be described. In this example it is now assumed that the techniques employed for compression will make use of "Moment Invarients", although other suitable compression techniques could be adopted.

Thus processing of the image data to produce the simplified identification is mainly concerned with calculating their normalized central moments. The calculation of such moments is known, see MING-KUEI HU 'Visual Pattern Recognition by Moment Invarients' IRE Transactions on Information Theory (1962) Vol. IT-8 pp. 179–187. This technique is adopted in this system and expanded to cope with the three dimensional objects which require recognition. Such moments are invarient to translation, rotation and scale change and as such are an ideal means of matching a captured image of the casting with a library of stored images. This first matching step results in the determination of one angle of orientation. A second step is required to obtain the other angle of orientation in a perpendicular plane.

Figure 4:
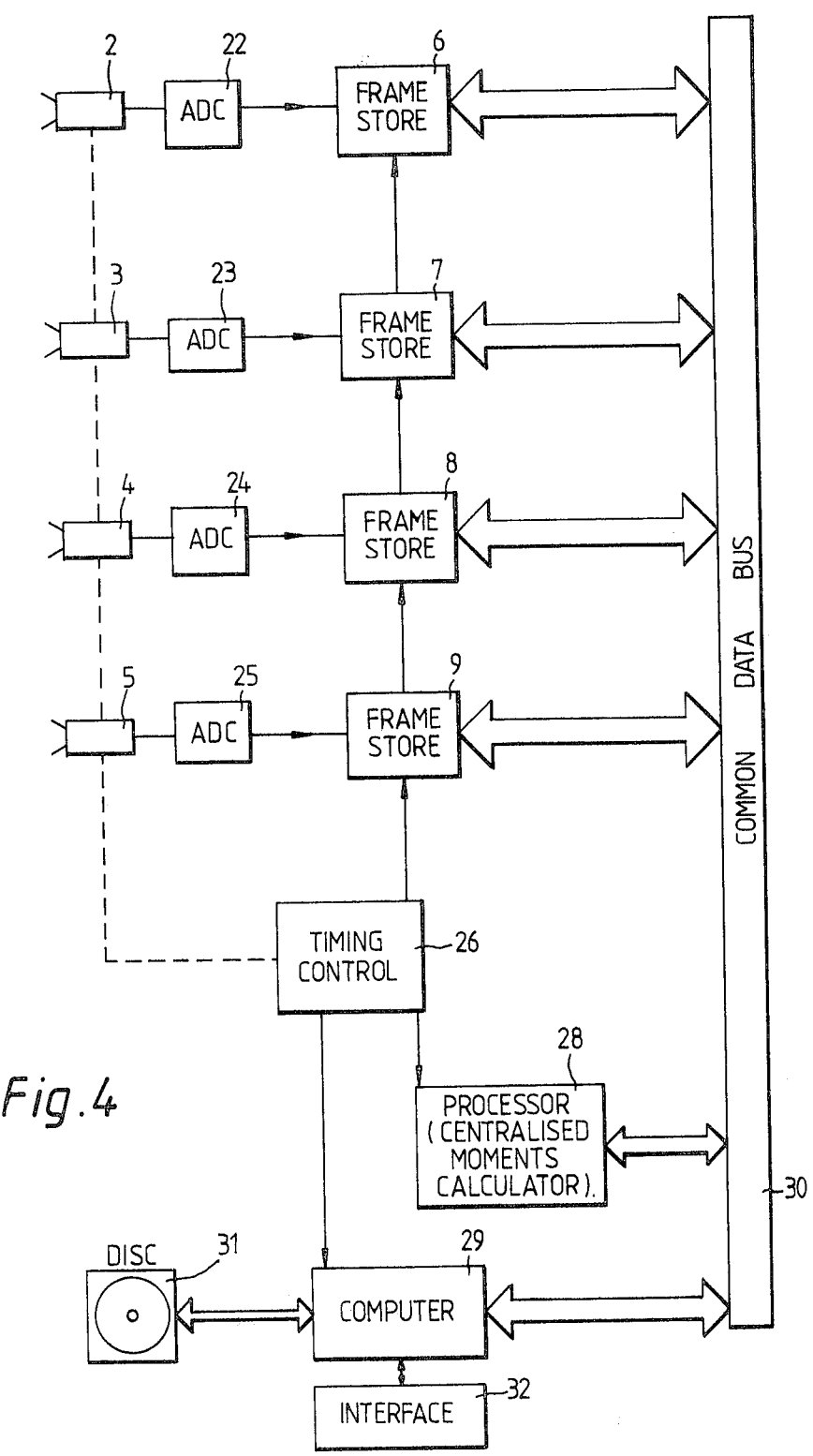
FIG. 4 shows one arrangement for realising the invention.

An arrangement based on FIG. 1 and suitable for handling the necessary processing is now shown in FIG. 4. The four cameras 2–5 are shown as analog devices with outputs passed to the digital frame stores 6–9 via associated analog to digital converters 22–25. Each of the frame stores is expediently shown having access to a common video data bus 30 with a computer 29 and a processor 28. Although a common system is shown, individual store control and processing may be utilised along the lines described in U.S. Pat. No. 4,148,070 for example. Each framestore holds the pictures captured from the four positions of its corresponding camera. The capture of the image and its position within the frame store is controlled by timing signals provided by control 26 in normal manner. The framestores are all linked by the common data bus 30 to the purpose built hardware within processor 28 used to calculate the centralised moments. This processor provides the compression function represented by blocks 10–13 of FIG. 1. Also on the data bus is the host computer 29 with access to a fast mass storage device acting as the image library and in this example is represented by magnetic disc 31.

The computer 29 and processor 28 are allowed access to the data when permitted by timing control 26 so that the centralised moments can be calculated (in processor 28) and the correlation effected (conveniently by computer 29). The computer can conveniently be programmed to provide the desired control function to the external machine or device via interface 32, rather than requiring the hardware look up table technique referred to above.

Starting with the cameras in the first position (position A of FIG. 2), four images are captured by the 4 cameras. The video function processor 28 calculates the normalized central moments of each image. This can be typically achieved in less than one second using the hardware based system described below. Each image in turn is compared with the library of stored images by a simple correlation of the seven invarient moments. The highest correlated pair of images (one from that 4 camera view and one from the library) is recorded and updated as the library search is made. The time for the search and correlation depends on the number of images stored in the library, but even with the number in the thousands, the time is about one second. The whole process is repeated with the casting and cameras in the second, third and fourth positions (positions B–D).

The optimum correlated pair readily define within the resolution of the incremental angular changes of the library images, the line chosen to uniquely determine the orientation of the casting.

A further step is required to obtain the orientation of the casting about this line. The 4 bit camera image which appeared in the optimum pair is projected onto the place perpendicular to the line. The image is repeatedly rotated (using the digital data) and correlated with the 4 bit stored library image using known techniques. The two images are not necessarily of the same scaling. At each rotation one image must be scaled so that the rectangle defined by the extremities of the image in the x and y direction is the same for both images. The optimum correlation provides the second angle of orientation of the casting.

As already explained with reference to FIG. 3, a library of image data is built up for use in the recognition system. In this embodiment, the normalised central moment is calculated for each camera position and these are stored to give no more than $\frac{1}{2}°$ error.

NORMALIZED CENTRAL MOMENTS

For a digital image a central moment is defined as:

$$\mu pq = \sum_x \sum_y (x - \bar{x})^p (y - \bar{y})^q f(x,y)$$

where f(x,y) is the greyscale value at point (x,y)

$$\bar{x} = \sum_{x,y} x f(x,y) / \sum_{x,y} f(x,y)$$

-continued
$$y = \sum_{x,y} y f(x,y) / \sum_{x,y} f(x,y)$$

and all summations are taken over the interior points of the image.

Normalized central moments are defined as:

$$\eta pq = \frac{\mu pq}{\mu oo^\gamma}$$

where $\gamma = \frac{p+q}{2}$

From the second and third normalized moments, a set of seven invarient moments can be derived (see Hu referred to above). These moments are invarient to translation rotation and scale change.

Figure 5:
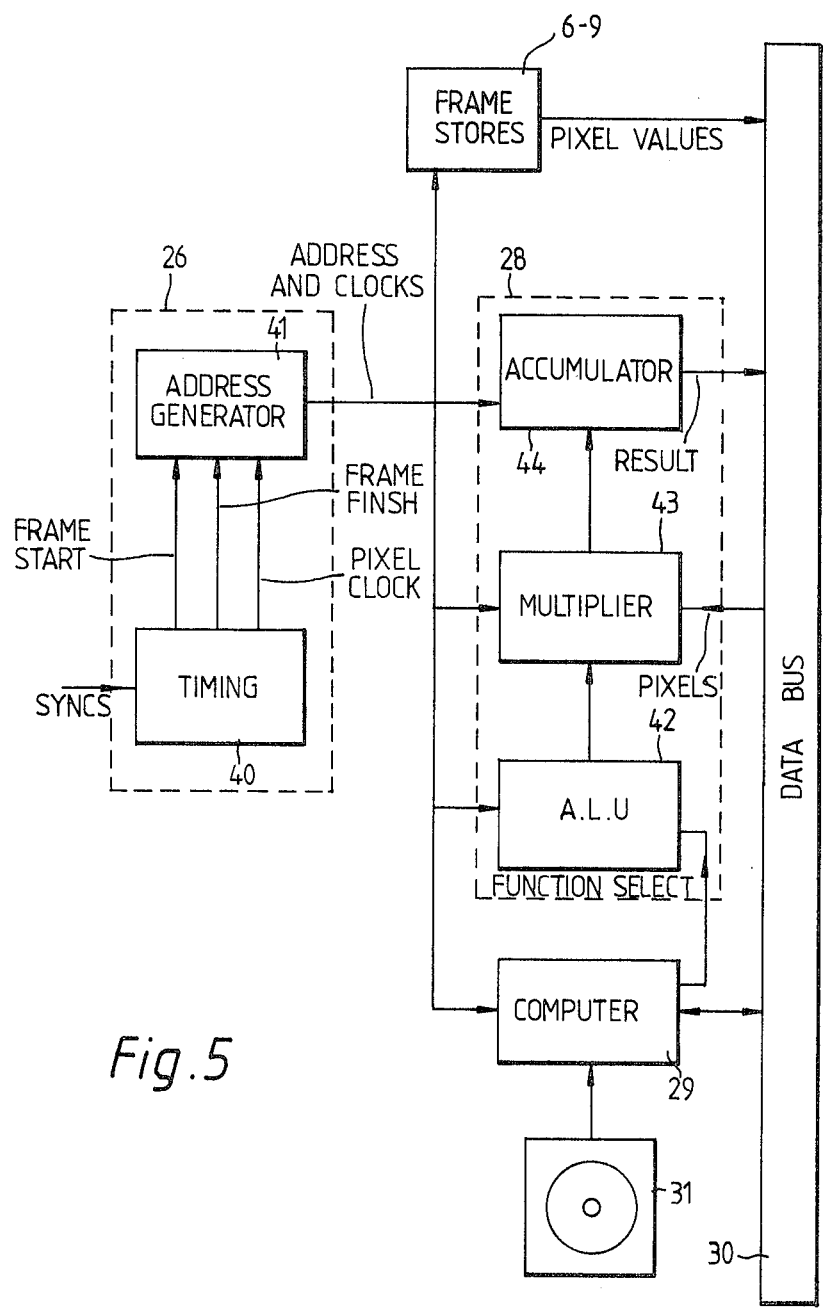
FIG. 5 shows aspects of the FIG. 4 arrangement in more detail.

The processor 28 used to calculate the centralised moments will now be described by way of example with reference to FIG. 5.

The timing block 40 within timing control 26 provides signals for initialisation and synchronisation of the processor hardware and the other system blocks. The address generator block 41 receiving frame timing and pixel clocks from block 40 provides the next framestore address whose pixel value is required in the moment calculation. This can be passed directly to the frame stores as shown or via the data bus 30 dependent on timing requirements. The ALU block 42 is a programmable arithmetic and logic unit which can calculate powers of the coordinates of the address as required by the moment definition. The function applied to the address by the ALU is selectable from the host computer 29 directly as shown or alternatively via the common data bus 30. The multiplier 43 allows the pixel value returned from the framestore together with the power of the address from the ALU to be multiplied. The accumulator 44 allows the result to be accumulated over an image and the result is passed to the host computer 29 to be correlated with stored values from disc 31.

As already explained the central moment is defined as $$\mu pq = \sum_x \sum_y (x - \bar{x})^p (y - \bar{y})^q f(x,y),$$

and thus some of the selected functions for the ALU 42 would typically be:

$$\mu 00 = \sum_x \sum_y f(x,y)$$

$$\mu 10 = \sum_x \sum_y (x - \bar{x}) f(x,y)$$

$$\mu 02 = \sum_x \sum_y (y - \bar{y})^2 f(x,y)$$

where f(x,y) is the pixel value at coordinate (x,y) in the frame store.

Although the system is shown employing ALU 42 dedicated hardware function blocks could alternatively be used.

Typical logic flow paths for the normalised central moments and "Term" calculations used therein are shown in FIGS. 6 and 7 respectively.

The present system using calculated moments enables the orientation of an object to be recognised by using only linear movement of the conveyor (without requiring the rotating table) and can handle various types of objects to say pick up one type without disturbing others.

An example of a typical application is shown in the flow diagram of FIG. 8 which shows additional manipulation steps effected after the movement correlation step effected by the computer 29, employing standard techniques.

Thus the calculation for central moments is shown followed by correlation and this is repeated for all 4 tilt positions of the camera. After completion of this stage the linear projection of the selected image is rotated and correlated against the previously stored selected image to determine the orientation.

The objects recognised need not be restricted to those moving along a conveyor nor need the recognised data be used to control a robot exclusively. Other camera configurations could also be employed.

I claim:

1. An object recognition system comprising, means for effecting relative movement between an object and a viewing position, means for deriving image data representing a plurality of images of the object taken from different viewing directions which are angularly disposed about the direction of said relative movement, data compression means for compressing the derived image data representing the image taken from each said viewing direction, a source of image data arranged to provide image data representative of images of the object taken from a plurality of reference viewing directions which are angularly disposed about a reference line corresponding to the aforesaid direction of said relative movement, the angular separation of said reference viewing directions being small in relation to the angular separation of the first mentioned viewing directions, and correlation means for comparing the compressed image data with image data from said source to produce an indication of which image represented by said derived image data has the highest correlation with any one of said reference images, so that the orientation of the object can be determined to an accuracy related to said relatively small angular separation.

2. A system according to claim 1, wherein the means for deriving said image data comprises a plurality of framestores receiving data from at least one camera.

3. A system according to claim 1 in which said means for deriving image data can be tilted at different angles to said direction of movement.

4. A system according to claim 3 in which said source of image data is also arranged to provide image data representative of images of the object taken at difference angles to a line corresponding to said direction of movement.

5. A system according to claim 1, wherein the compression means is responsive to said derived image data to produce compressed data representing centralised moments of the object.

6. A system according to claim 5, wherein the compression means includes a function controller and arithmetic device for producing said data representing the centralised moments in steps determined by the function provided from said controller.

7. A system according to claim 5, wherein the correlation means includes an orientation manipulator to allow the relative orientation of the object to be determined.

8. A system according to claim 1, wherein a controlled interface is provided responsive to said correlation means to effect control of an interfaced device connected thereto in dependence upon the indication provided by said correlation means.

9. A method of recognising the orientation of an object comprising the steps of, effecting relative movement between an object and a viewing position, deriving image data representing a plurality of images of the object taken from different viewing directions which are angularly disposed about the direction of said relative movement, compressing the derived image data representing the image taken from each said viewing direction, providing image data representing images of the object taken from a plurality of reference viewing directions which are angularly disposed about a reference line corresponding to the aforesaid direction of said relative movement, the angular separation of said reference viewing directions being small in relation to the angular separation of the first mentioned viewing directions, and comparing the compressed image data with image data representing said reference images to produce an indication of which image represented by said derived image data has the highest correlation with any one of said reference images, so that the orientation of the object can be determined to an accuracy related to said relatively small angular separation.

* * * * *